United States Patent [19]

Smoller et al.

[11] 4,196,336

[45] Apr. 1, 1980

[54] METHOD OF HARD SURFACING A METAL OBJECT

[75] Inventors: Stanley B. Smoller, Southfield; Gerald I. Frock, Detroit, both of Mich.

[73] Assignee: Pennwalt Corporation, Philadelphia, Pa.

[21] Appl. No.: 843,766

[22] Filed: Oct. 20, 1977

[51] Int. Cl.² .............................................. B23K 9/04
[52] U.S. Cl. .................................... 219/76.15; 219/75; 219/77
[58] Field of Search ................... 219/74, 76.14, 76.15, 219/146.51, 77, 76.1, 137 R, 75

[56] References Cited

U.S. PATENT DOCUMENTS

| | | | |
|---|---|---|---|
| 2,137,471 | 11/1938 | Zublin | 219/146.51 |
| 3,231,709 | 1/1966 | Foley | 219/146.51 X |
| 3,405,247 | 10/1968 | Hlivka | 219/74 |
| 3,526,352 | 9/1970 | Jackson | 219/76.14 X |
| 3,644,697 | 2/1972 | Krahl | 219/74 |
| 3,808,397 | 4/1974 | Wilson | 219/74 |
| 3,825,721 | 7/1974 | Carroll | 219/146.52 |

*Primary Examiner*—Elliot A. Goldberg
*Attorney, Agent, or Firm*—Edward A. Sager

[57] ABSTRACT

A hard surface on reactive metal such as a titanium member is weld deposited in an inert gas atmosphere using a welding rod tubing made of the same metal as the member and filled with tungsten carbide particles.

10 Claims, No Drawings

METHOD OF HARD SURFACING A METAL OBJECT

BACKGROUND OF THE INVENTION

This invention relates to a method of hard surfacing objects of titanium or similar metals by weld depositing a layer of tungsten carbide on the surface thereof.

Titanium, zirconium, gallium and tantalum are strong, light and corrosion resistant metals. This group is also quite soft when compared with ferrous metals, and other materials commonly used for structural members and machine parts. The present invention is therefore directed to improving the surface hardness of objects made of titanium and similar materials in order to produce a strong, light, corrosion resistant object having a hard surface.

Metals of the group mentioned are known as reactive metals which form very brittle compounds, e.g. titanium oxide, when oxidized. For this reason, they have been considered poor candidates for hard surfacing with the carbides, primarily tungsten carbide and possibly others including boron carbide.

SUMMARY OF THE INVENTION

According to the present invention, a titanium object or member may be hard surfaced by weld depositing a layer of tungsten carbide on the surface thereof, using a welding rod made of titanium tubing filled with tungsten carbide. Deposition is accomplished by arc welding in an inert gas atmosphere of helium, or argon, or a mixture of argon and nitrogen. In such a mixture of argon and nitrogen, the nitrogen content may be 12% and upwards, say 15%, but 5 to 8% is preferred.

DETAILED DESCRIPTION OF THE INVENTION

The present invention was applied to hard surfacing an axial screw conveyor of a centrifuge apparatus of the general type disclosed in U.S. Pat. No. 3,764,062 of F. C. Brautigam, assigned to the assignee of the present invention. This was done in order to provide a layer of hard material on screw flights made entirely of titanium and having no wear resistant assemblies attached thereto. However, the present invention is equally applicable to the hard surfacing of other objects and members made of titanium and similar metals.

Hard surfacing in the case of the centrifuge part was accomplished by weld deposition on the surface of the titanium object, using gas tungsten arc welding (GTAW) technique in an inert gas atmosphere or curtain comprising a mixture of 95% argon and 5% nitrogen, although mixtures with argon of 5 to 8% nitrogen give excellent results. Satisfactory results are obtainable in such mixtures of argon and nitrogen having nitrogen in amounts up to about 12%, but an amount of nitrogen above 15% is not likely to be entirely satisfactory. Alternatively, other inert gases such as helium or 100% argon may be employed to completely envelop the weld deposit as it is being deposited, thereby preventing oxidation from taking place. It is theorized, however, that with a mixture of argon and nitrogen optimum results are obtained because the hard titanium carbide deposit will be held to the tungsten by a matrix of titanium carbide and/or titanium nitride, both of which are very hard, corrosion resistant materials.

The foregoing GTAW technique is facilitated by use of a welding rod made of titanium tube stock of ¼" diameter, having a wall thickness of 0.010 to 0.015 inches, filled with tungsten carbide powder. The particle size of the tungsten carbide powder may be random size, preferably in the range of 50 to 100 mesh. The particle size and the diameter of the tubing is not critical to practice of the invention. The above proportion of tungsten carbide to titanium is about 12:1 by weight in a rod so made, and such proportion is recommended for satisfactory results.

The experimental application of hard surfacing to a centrifuge screw conveyor by the technique described in detail as aforesaid produced an even, smooth and hard layer on a screw flight made of titanium. It has been operated for a number of months in a separation process for the production of calcium hypochlorite, withstanding chemical attack and abrasion from separated crystals with excellent results.

MODIFICATIONS

Based on the above experimental results, hard surfacing of an object made from the group consisting of titanium, zirconium, gallium and tantalum may be accomplished in like manner. The welding rod used in the GTAW process should be fabricated from tubing made of the same metal as that of the object being coated and filled with tungsten carbide powder so that the weight of tungsten carbide to that of the metal tube is about 12 to 1. The inert gas curtain may be 100% helium or argon; but preferably it is a mixture of argon and nitrogen with 5 to 8% nitrogen although 12% nitrogen and upwards will yield satisfactory results.

What is claimed is:

1. The method of applying a hard surface to an object made of metal from the group comprising titanium, zirconium, gallium and tantalum, to produce a strong, light, corrosion resistant, abrasion resistant object having a hard smooth surface including the steps of:
   (a) providing a welding rod made of a tube of the same metal as said object and filled with tungsten carbide powder; and
   (b) weld depositing said tungsten carbide on the surface of said object by arc welding with said welding rod in an envelope of inert gas.

2. The method of claim 1 wherein the inert gas is selected from the group comprising helium, argon and a mixture of argon and nitrogen.

3. The method of claim 2 wherein the inert gas is a mixture of up to about 15% nitrogen and the balance argon.

4. The method of claim 3 wherein the mixture contains about 5 to 8% nitrogen.

5. The method of claim 1 wherein the weight ratio of the tungsten carbide powder to the metal of said tube is about 12 to 1.

6. The method of claim 1 wherein said tungsten carbide powder has a grain size of about 50 to 100 mesh.

7. The method of claim 1 wherein the weld depositing step is a gas tungsten arc welding technique.

8. The method of claim 1 wherein the metal of said object is titanium, the metal of said tube is titanium, the weight of said tungsten carbide present in said welding rod is about twelve times the weight of said titanium tube, and the inert gas is a mixture of argon and nitrogen.

9. The method of claim 8 wherein about 5 to 8% nitrogen is present in said mixture of inert gas.

10. The method of hard surfacing a titanium screw flight of a centrifuge screw conveyor comprising the steps of:
(a) providing a welding rod made of titanium tubing filled with tungsten carbide powder, with a weight ratio of tungsten carbide to titanium of about 12 to 1; and
(b) weld depositing said tungsten carbide on the surface of said screw flight by arc welding with said welding rod in an envelope of an inert gas selected from the group consisting of helium, argon, and a mixture of argon and up to about 15% nitrogen.

* * * * *

UNITED STATES PATENT OFFICE
CERTIFICATE OF CORRECTION

Patent No. 4,196,336            Dated April 1, 1980

Inventor(s) Stanley B. Smoller and Gerald I. Frock

It is certified that error appears in the above-identified patent and that said Letters Patent are hereby corrected as shown below:

Column 1, line 63, "titanium" should read --tungsten--.

Column 1, line 64, "tungsten" should read --titanium--.

Signed and Sealed this

Fifth Day of August 1980

[SEAL]

Attest:

SIDNEY A. DIAMOND

Attesting Officer      Commissioner of Patents and Trademarks